Nov. 23, 1965    W. B. KILGORE    3,219,737
METHOD OF STRAIGHTENING BEADS OF AN ONLY
PARTIALLY CURED HOT TIRE
Original Filed July 15, 1960

INVENTOR.
WOODSON B. KILGORE
BY
Wilson, Settle & Craig
ATTORNEYS

United States Patent Office 3,219,737
Patented Nov. 23, 1965

3,219,737
METHOD OF STRAIGHTENING BEADS OF AN ONLY PARTIALLY CURED HOT TIRE
Woodson B. Kilgore, Livonia, Mich., assignor to Firwood Manufacturing Company, Dearborn, Mich., a corporation of Michigan
Original application July 15, 1960, Ser. No. 43,027, now Patent No. 3,128,807. Divided and this application May 8, 1963, Ser. No. 292,172
2 Claims. (Cl. 264—100)

This application is a division of my co-pending application Serial No. 43,027, filed July 15, 1960, now Patent No. 3,128,807.

This invention relates to improvements in methods for the post-inflation of tires for stretching and cooling after the tires have been removed from the molding machine, and more particularly to methods for handling the beads of tires during the post-inflation operation.

It is a primary object of the present invention to provide an improved method for, and straightening warped beads of partially cured tires which have been removed from the molds and holding the beads straight until the curing is finished and the tire cooled. More specifically this is accomplished by pressing the tire beads firmly into contact with each other before inflating the tire, in order both to straighten the beads and to form an initial seal between the beads and the tire rings.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in the application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
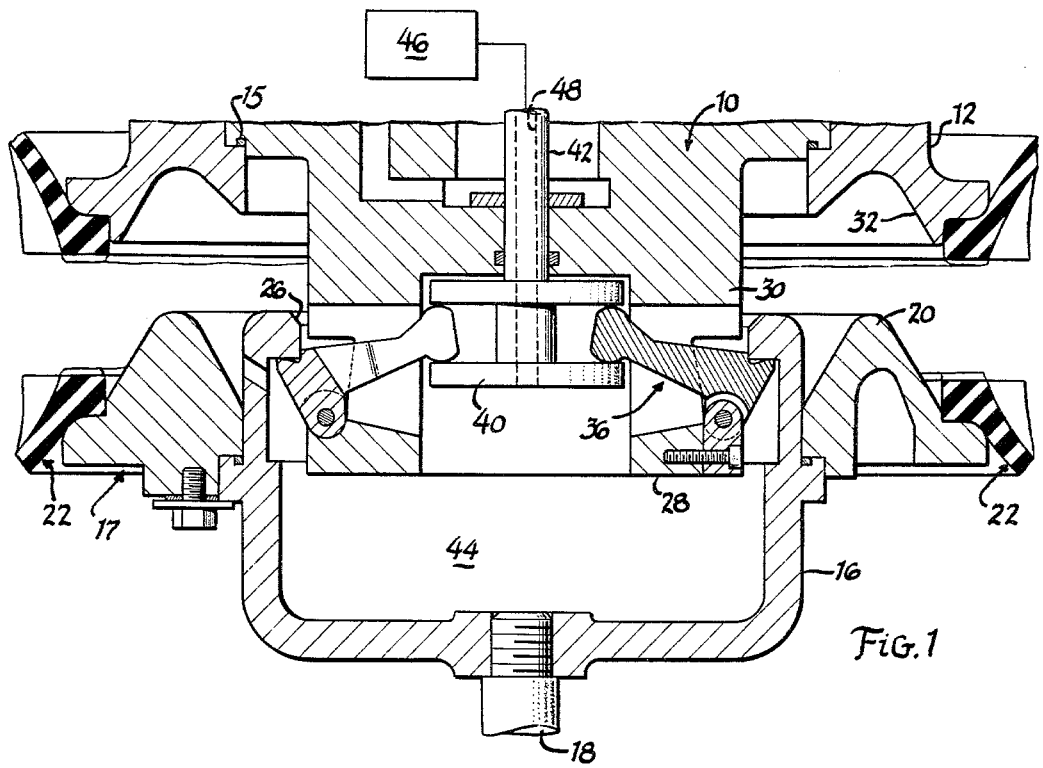
FIG. 1 is a vertical section through an inflated tire supported on a chuck in locked position.

Referring to FIG. 1 a tire chuck is formed collectively by two separable chuck halves or chuck members. The upper member includes a principal body 10 which is mounted in a fixed position by suitable means, not shown, and a removable interchangeable tire ring 12 detachably secured to it by suitable means and a pressure tight seal such as an O-ring 15 to provide for different sizes of tires. The lower half or member is movable axially—i.e. vertically in FIGURE 1—toward and away from body 10 and includes a principal body 16 and a tire ring 17 similarly secured and sealed. The chuck halves 10 and 16 can be axially separated a sufficient distance so that a tire 22 may be positioned between the opened chuck halves. The halves together constitute a support which holds the tire for inflation like a vehicle wheel. The lower chuck body is raised and lowered by any suitable means such as a machine which successively grips a stud 18, raises the stud to position the chuck halves together and releases the stud. As the lower half 16–17 is being raised, a male conical guide 20 on ring 17 centers a tire 22 and the ring 17 supports the tire. As the tire is lifted towards the position in which it is clamped between the two rings, the surface 26 of the lower body 16 is piloted on a circular group of lock supports 28 formed integral with a central boss 30 of the upper body 10. As the lower body is further raised the conical guide 20 is accurately centered by a female conical guide surface 32 of the upper ring 12 so that the tire beads 80 and 82 are supported and flattened against each other to straighten any warped beads and to form an initial seal between the outside of each bead and the ring 12 or 17 (see FIGURE 3). When this occurs the male guide ring 20 may be bottomed in the female guide 32 or nearly so and the surface 26 is in the position shown in FIGURE 3.

Figure 3:
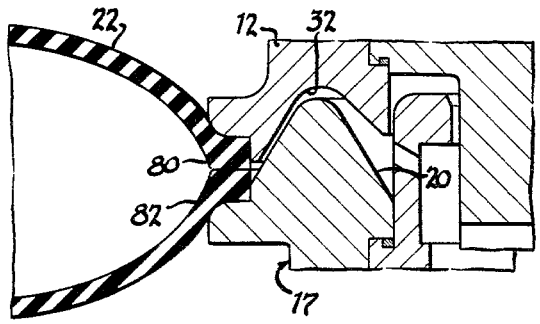
FIG. 3 is a cross section similar to FIG. 2 showing the beads flattened against the rims to form sealing contacts.

The spaces between adjacent lock supports 28 form recesses for receiving locking dogs 36 which are moved into their locking position when the chuck halves are in the FIGURE 3 position in a manner described in my parent application Serial No. 43,027. Then, and only then, inflation of the tire is begun. This separates the chuck halves from the position shown in FIGURE 3 to the position shown in FIG. 1, the chuck halves being positively held against further separating movement by the dogs 36 and being thus positively locked.

The dogs are moved into locked and unlocked position and are held in either position by circular member 40 secured to the end of a hollow locking rod or plunger 42. Member 44 is manipulated to lock or unlock dogs 36 in a manner more fully described in my parent application Serial No. 43,027.

Air for inflating a tire supported upon the chucks is supplied to the chamber 44 from a schematically illustrated air supply 46 which communicates with chamber 44 via the passage 48 defined by the hollow interior of plunger 42. The manner in which air under pressure is supplied to or vented from chamber 44 is described in detail in my parent application Serial No. 43,027.

Figure 2:
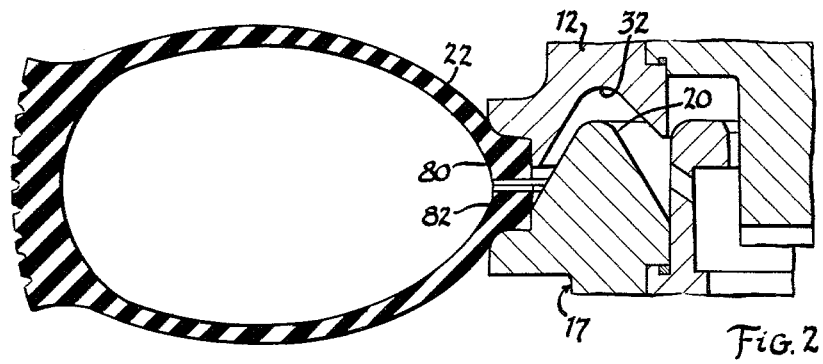
FIG. 2 is a schematic partial cross section of a tire showing the beads in their position of initial contact.

Referring to FIGS. 2 and 3, when the tire is to be inflated, it is important that the two beads 80 and 82 form a pressure-tight seal with the tire rings 12 and 17. It is not sufficient for the beads merely to be in contact as in FIG. 2, because air can leak between the beads and the rings and prevent establishment of the proper pressure in the tire. This happens more often when the beads are warped and do not make contact all around with the flanges 84 of the rings. Warping of the beads is a quite common occurrence in post-inflating operations because the tire is still highly heated from the forming operation and the beads are readily susceptible to warping during handling of the tire between the mold and the post-inflator. To straighten any warped beads and to insure sealing, I so proportion the guide surfaces 20 and 32 and so arrange the support of the stud 18 which lifts the lower chuck member that when the lower chuck half is fully raised, the beads are not only straightened but are pressed against the rims firmly enough to provide an effective seal. Sufficient force is supplied to flatten even badly warped beads against the plane surfaces of the flanges and to hold them against the flanges to effect a pressure-tight seal.

Of course the two beads are held together against each other with the same force. I have found, surprisingly, that this does not interfere with air passing between the beads to inflate the tire when pressures, for example, of 80 pounds per square inch or more are used. This seems to be made possible by irregularities in the bead surfaces or corners, so that very soon air in small streams can force the beads apart along thin lines to provide narrow channels into the tire, while the force of the pressure over the whole area of the beads against the flanges preserves the sealing contact between the flanges and the beads. Soon the pressure in the chuck separates the beads and the chuck halves as far as the locks permit, but I have found that by the time the beads begin to separate the pressure of the air inside the tire has become high enough to maintain the seal between the beads and the flanges, as it does in a tubeless tire in service on a wheel.

In FIG. 1 the stud 18 represents means for urging the chuck halves toward each other enough to seal the beads as above described.

Having thus described the invention, what is claimed as new is as follows:

1. The method of finishing and straightening hot molded tires having warped beads which consists in supporting in a plane the outer side of each bead of a hot tire continuously around the circumference of the bead, the beads forming the sole support for the tire, pressing each bead between its supporting plane and the opposite bead, supplying air under pressure to the tire between the beads while so pressed together separating the beads while under pressure to the positions they occupy when in normal use on a vehicle wheel, whereby the beads are supported flat and under pressure, and cooling the tire while the beads are so supported.

2. In a method of post inflating a tire having beads while the tire is still hot and only partially cured from the tire molding operation; the improvement comprising the steps of supporting the axially outer side of each bead of the hot and partially cured tire in a plane continuously around the circumference of the bead, axially pressing the supported beads inwardly against each other into continuous face-to-face contact with each other to force the beads into a flat parallel relationship with each other to thereby eliminate any warping of the bead, supplying air under pressure between the beads to the interior of the tire to inflate the tire and to axially separate the beads while maintaining the aforementioned continuous circumferential support at the axially outer sides of the beads, and maintaining the tire inflated until the tire has cooled.

References Cited by the Examiner
UNITED STATES PATENTS

| | | | |
|---|---|---|---|
| 2,133,438 | 10/1938 | Eger | 157—13 |
| 2,866,500 | 12/1958 | George et al. | 157—13 |
| 3,042,091 | 7/1962 | Dunton | 144—288 |

ROBERT F. WHITE, *Primary Examiner.*

ALEXANDER H. BRODMERKEL, *Examiners.*